United States Patent
Zorzi (10) Patent No.: US 10,480,343 B1
(45) Date of Patent: Nov. 19, 2019

(54) RE-CIRCULATING HEAT PUMP TURBINE

(71) Applicant: Kim Alexander Zorzi, Hempstead, TX (US)

(72) Inventor: Kim Alexander Zorzi, Hempstead, TX (US)

(*) Notice: Subject to any disclaimer, the term of this patent is extended or adjusted under 35 U.S.C. 154(b) by 0 days.

(21) Appl. No.: 15/971,290

(22) Filed: May 4, 2018

Related U.S. Application Data (60) Provisional application No. 62/531,466, filed on Jul. 12, 2017.

(51) Int. Cl.
| | | |
|---|---|---|
| *F01D 15/10* | (2006.01) | |
| *F01D 1/32* | (2006.01) | |
| *F01D 1/36* | (2006.01) | |

(52) U.S. Cl.
CPC ............ *F01D 15/10* (2013.01); *F01D 1/32* (2013.01); *F01D 1/36* (2013.01); *F05D 2220/40* (2013.01)

(58) Field of Classification Search
CPC ..... F03G 7/10; F03G 6/02; F03G 6/04; F02G 1/00; F02G 1/04; F02G 2254/45; F02G 2280/20; F01K 13/00; F01K 13/02; F01K 25/00; F01K 25/06; F01K 27/00; F01K 27/02; F01D 15/10; F01D 1/32; F01D 1/36; F05D 2220/40
USPC ......... 60/370, 327, 407, 409, 412, 645, 598, 60/650
See application file for complete search history.

(56) References Cited

U.S. PATENT DOCUMENTS

| | | | | |
|---|---|---|---|---|
| 8,432,048 B1* | 4/2013 | Paulino | ............... | B60K 3/04 290/1 A |
| 2004/0025513 A1* | 2/2004 | Walsh | ............... | F02C 3/305 60/775 |
| 2006/0248899 A1* | 11/2006 | Borchert | ............... | F02C 7/08 60/791 |
| 2012/0000642 A1* | 1/2012 | Betzer Tsilevich | ...... | B03D 1/02 166/57 |

* cited by examiner

*Primary Examiner* — Mark A Laurenzi
*Assistant Examiner* — Mickey H France
(74) *Attorney, Agent, or Firm* — Gugliotta & Gugliotta LPA

(57) ABSTRACT

A super-heated self-compressed air rotary turbine driving a built-in, outside-in axial flux generator is provided for providing power to heaters in thermal communication with the walls of the turbine chambers. Moisture within the working fluid is thus heated, making steam and thereby increasing the pressure of the working fluid. The compression caused by the turbine rotation also increases temperature. The discharge of each turbine chamber is feeding a nozzle. The shaft power drives a main generator, and after passing over the turbine the air stream maintains a portion of its initial energy. The remaining energetic air stream left is then cycled to the compressor, thereby completing the cycle. A main generator driven by the turbine can remain approximately constant, regardless of the load. Input to the compressor can be regulated with the rpm of the compressor motor and the current to the heaters in the turbine.

18 Claims, 10 Drawing Sheets

NOTES:

CONSTANT: K=468.75
HEAD PRESSURE: 100 PSI

VARIABLES: NEWTONS OF FORCE
QUANTITY OF NOZZLES
TURBINE DIAMETER
RPMs
HEAD PRESSURE

REFERENCE: A.) RADIAL TURBINE POWER CHART
B.) OZF TO NEWTON CHART
C.) MANUFACTURERS OZF/PSI CHART ON NOZZLE PERFORMANCE.

THE ELECTRIC DC MOTOR WILL BE ABLE TO SPIN UP THE SUPERCHARGER TO A MAXIMUM OF 6000 RPM. THIS WILL PROVIDE A HEAD PRESSURE ON THE AIR TURBINE A MAXIMUM OF 700 PSI. THIS EQUATES INTO 87.5 PSI PER NOZZLE. THE NOZZLE SELECTED IS PRODUCING AT 87 PSI A REACTION FORCE OF 30 OUNCES OR 8.34 NEWTONS.

T{Nm} = 8.34N (PER NOZZLE) × 8 NOZZLES × .2m (8") = 13.3Nm

Pshaft = 6.2831 × 1500 × 13.3 × 468.75 / 1000 = 979.3 kw or 1312 hp

BUT ONLY 300 HP IS REQUIRED FOR THE (2) 147 Kw DC GENERATORS SO THE PRESSURE PER NOZZLE HAS TO BE REDUCED TO A LOWER FIGURE.

SO THE AMOUNT REQUIRED WOULD BE 7.16 OZF OR 3.2 Nm WOULD DELIVER 235.5Kw or 315 HP.

HEATED EXHAUSTED AIR RETURNING TO THE SUPERCHARGER FROM THE EXHAUST OF THE AIR TURBINE WILL BE EQUIVALENT TO 5Kw AND THIS IS WHAT WILL BE USED TO SPIN UP THE TESLA TURBINE ATTACHED TO THE TAIL SHAFT OF THE SUPERCHARGER. THIS REDUCES THE DC ELECTRIC MOTOR INPUT AND THERE FORE REDUCES THE POWER DRAWN ON THE BATTERY. IT IS A FACT THAT THE RETURN PRESSURE AND HEAT COMBINED WILL BE ABLE TO SPIN THE TURBINE TO 5000 RPMS CREATING A GREATER HEAD PRESSURE SUSTAINING THE TURBINE TO A 315 HP OUTPUT.

THE ELECTRIC MOTOR WILL THEN BE REMOVED FROM THE EQUATION LEAVING THE CHARGING SYSTEM TIME TO RE-CHARGE THE LITHIUM ION BATTERIES. BUT UNDERSTAND THIS IS NOT A CONTINUOUS DESIGN AND DUE TO PRESSURE LEAKAGE THE ELECTRIC MOTOR WILL HAVE TO KICK BACK IN AT SOME LATER TIME TO RECHARGE THE AIR PRESSURE CIRCUIT.

NOTES FOR SUPER HEATED AIR CORE

1.) THE COMPRESSOR IS FEEDING THE AIR INTO THE CORE CHAMBERS AND IT IS BEING HEATED EXPANDING ITS VOLUME 1.7 TIMES. ATOMIZED WATER IS INJECTED.

2.) THE VELOCITY OF THE AIR STEAM IN THE ORIFICE OF THE NOZZLE IS 15 × 1.7 = 25 TIMES FASTER THAN AT THE INTAKE. THE WATER WE ADD FOR STEAM WILL TRIPLE THE WEIGHT OF THE AIR AND ADD SOME INCREASE OF THE VOLUME.

3.) DUE TO ROTATIONAL VELOCITY, THE TURBINE IS COMPRESSING BETWEEN FOUR TO SIX TIMES MORE. THIS IS WHAT MAKES THE AIR FLOW 25 TIMES AS FAST IN THE NOZZLES AS IT WAS IN THE INLET. THE NOZZLE SELECTED IS PRODUCING A NOZZLE FORCE WITH 100 PSI, A REACTION FORCE OF 8.34 NEWTONS.

4.) THE AIR STEAM PRESSURE IS DROPPING OFF SOME, BUT THE TEMPERATURE IS DROPPING MORE. THEN THE THERMAL ENERGY AND THE PRESSURE ENERGY WILL WITH TIME EVEN OUT. IT IS THE PRODUCT THAT COUNTS AND SINCE WE CONSIDERED THEY BOTH TO BE 50% THEN THIS PRODUCT IS THE FACTOR TO SQUARE EQUAL 1.25. THE GOAL IS FOR EACH OF THESE FACTORS TO TO BE ABOUT 70% SO THAT THE TOTAL ENERGY CONTENT OF THE EXHAUST AIR STEAM IS 50%.

5.) THE COMPRESSOR IS GOING TO SCOOP UP WHAT IT NEEDS OF THE EXHAUST TO SUPPLY THE TURBINE WHAT IT NEEDS TO PRODUCE THE SHAFT POWER WE ARE ASKING FOR. THE LARGER THE ENERGY CONTENT IS THE LESS VOLUME NEED TO BE CIRCULATED.

6.) IN ORDER FOR THIS TO BECOME A SELF-SUFFICIENT SYSTEM, MORE THAN 30 PERCENT OF THE PRESSURE AND THE TEMPERATURE WOULD HAVE TO BE USED. THIS SYSTEM DESIGN WILL BE ABLE TO CAPTURE AT LEAST 50 PERCENT.

SUPERCHARGER LINEAR GRAPH
SCALE: NTS

A.) TO OBTAIN THE ABOVE PRESSURE AT 200 PSI, THE ELECTRIC MOTOR WOULD HAVE TO SPIN UP TO 1700 RPM.

B.) THE SUPERCHARGER IF OBTAINING 2000 RPM COULD OBTAIN A HEAD PRESSURE OF 230 TO THE TURBINE. IF THE TURBINES HEATED EXHAUST PRESSURE SATURATED WITH SOME STEAM CAN SPEND THE TESLA TURBINE TO 5000 RPM WHICH IS HIGHLY LIKELY, THEN THE RESULTING HEAD PRESSURE WILL BE 590 PSI FROM THE SUPERCHARGER. THIS EQUATES INTO 74 PSI PER NOZZLE, 5 NEWTONS FORCE OUTPUT.

FIG. 11

RE-CIRCULATING HEAT PUMP TURBINE

RELATED APPLICATIONS

The present application claims benefit of U.S. Provisional Application 62/531,466 filed on 12 Jul. 2017 and incorporated by reference as if fully rewritten herein.

BACKGROUND OF THE INVENTION

1. Field of the Invention

The present invention relates generally to air engines, and, more particularly, to a super-heated self-compressed air rotary turbine.

2. Description of the Related Art

Air engine technology has been based on piston designed combustion engines that use high pressure compressed air bottles that are heavy and impractical. These engines are bulky and not suited for converting compressed air into kinetic work output. While any type of combustion engines must be cooled, as compressed air engine technology is opposite in requiring heat in order to create expansion in the air working fluid. Further, air engines would allow for a deletion of a significant amount of parts, such as radiators, exhaust, gasoline tanks, and anything else relating to combustion technology.

To use compressed air for producing work output in a practical form, new engine technology must be designed to complement the application.

SUMMARY OF THE INVENTION

It is an object of the present invention to provide new technology for an air engine for producing work output.

It is a feature of the present invention to provide an improve air engine incorporating a super-heated, self-compressed air rotary turbine.

Briefly described according an exemplary embodiment of the present invention, a built-in, outside-in axial flux generator is provided for providing power to heaters in thermal communication with the walls of the turbine chambers. Moisture within the working fluid is thus heated, making steam and thereby increasing the pressure of the working fluid. The compression caused by the turbine rotation also increases temperature. The discharge of each turbine chamber is feeding a nozzle, giving it the impression of a sprinkler. Such a turbine design is very efficient and also triples the shaft power with extended torque radius resulting from the increased reaction force of the nozzles. The shaft power drives a main generator, and after passing over the turbine the air stream maintains half of its initial energy. The remaining energetic air stream left is then cycled to the compressor, thereby completing the cycle. In operation, a DC bus voltage, which is the main generator, can remain approximately constant, regardless of the load. Input to the compressor can be regulated with the rpm of the compressor motor and the current to the heaters in the turbine.

It is an advantage of the present invention to be capable of producing electrical energy continuously without additional fossil fuel when coupled to an appropriately designed electrical generator.

It is another advantage of the present invention in another embodiment to be capable of use in electric transportation vehicles as a "Range Extender" or into any other assembly that needs an independent electrical generated source of power to operate.

Further still, the present invention can be used directly to power up any mechanical equipment such as pumps, transmission assemblies, etc. to produce a steady work output.

Further objects, elements, features and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
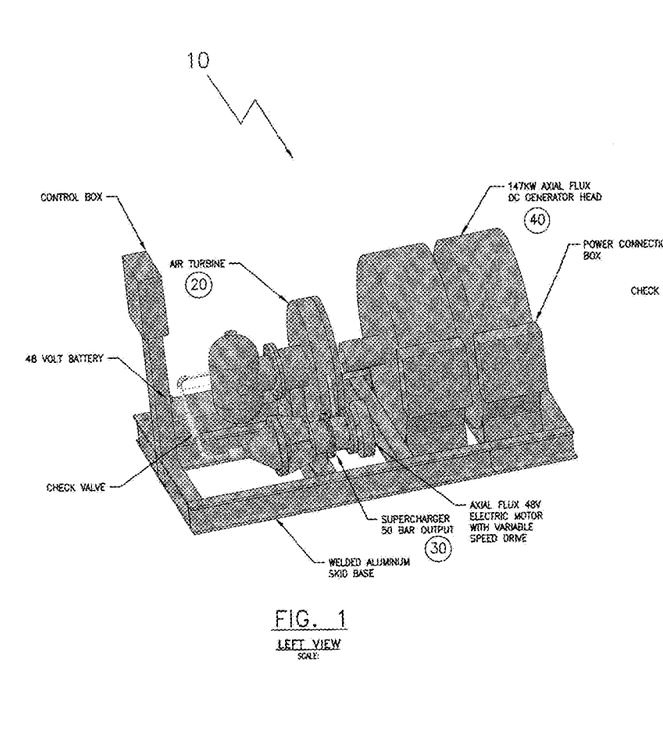
FIG. 1 shows a left side perspective view of a power unit assembly utilizing an air turbine generator formed of an Air Turbine 20 coupled to a supercharger 30 and DC generator 40 according to a preferred embodiment of the present invention.
Figure 2:
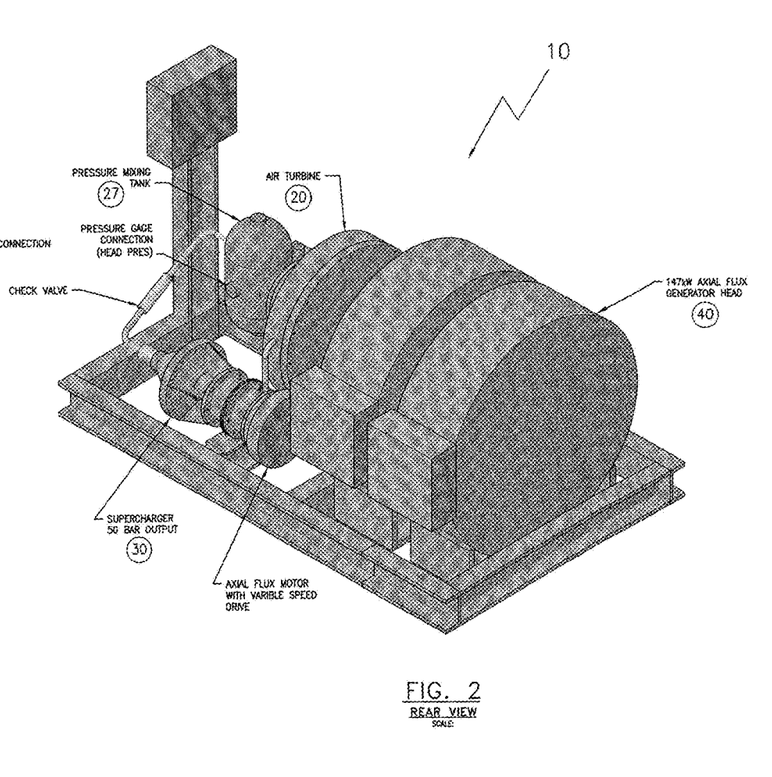
FIG. 2 is a rear perspective view thereof.

Referring now to the drawings, FIG. 1-2 show perspective views of a re-circulating heat pump turbine, also referred to as an air turbine generator (or "ATG"), and generally noted as 10, according to a preferred embodiment of the present invention. The air turbine generator 10 consist generally of an air turbine 20 coupled to a supercharger 30 and driving a DC generator 40.

Figure 4A:
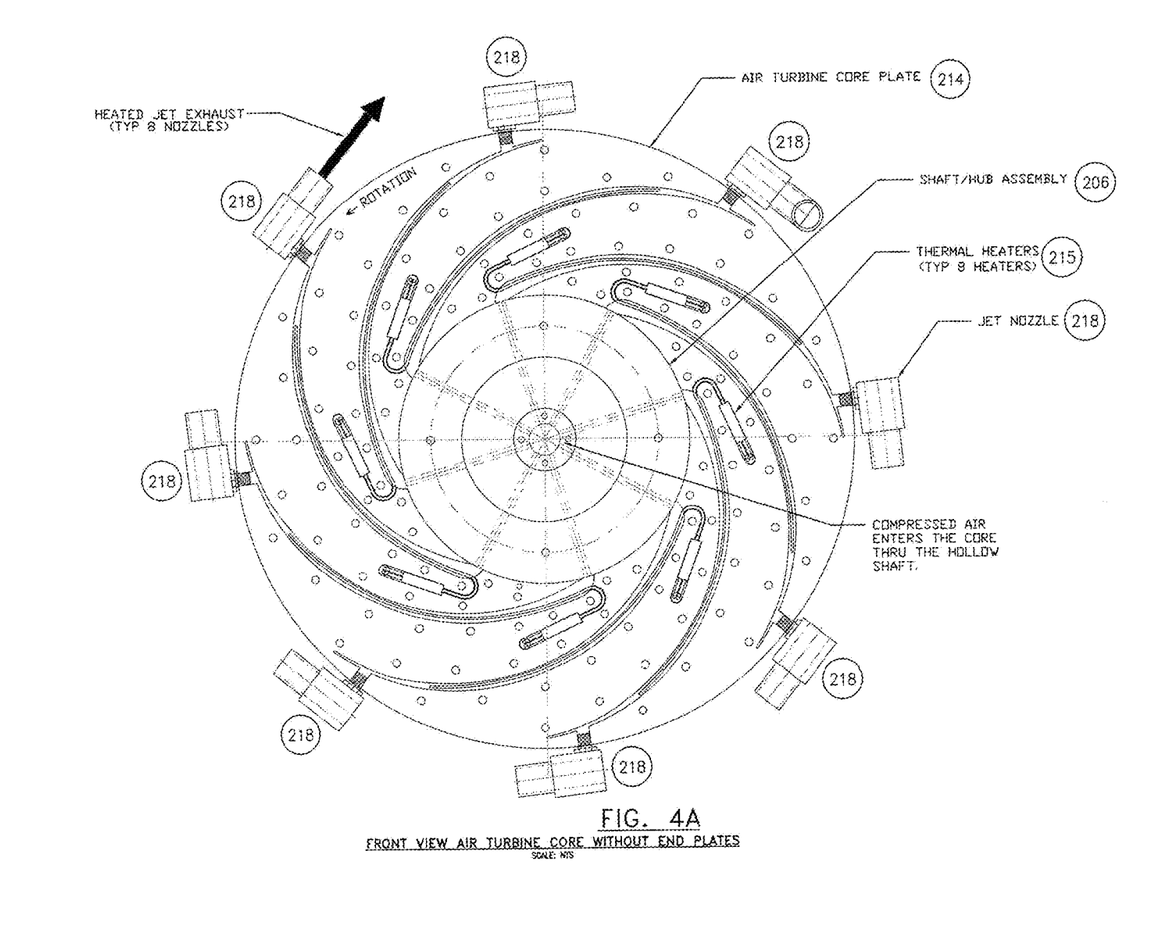
FIG. 4a is a detailed front plan view of a rotating core assembly 206 forming descending chambers 22 and having attached heating elements 24 and jet nozzles 218 for use with the air turbine 20 therein.
Figure 4B:
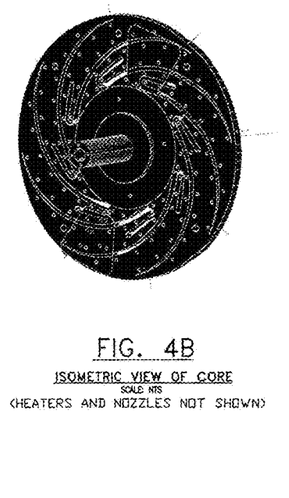
FIG. 4B is an isometric view thereof.
Figure 5:
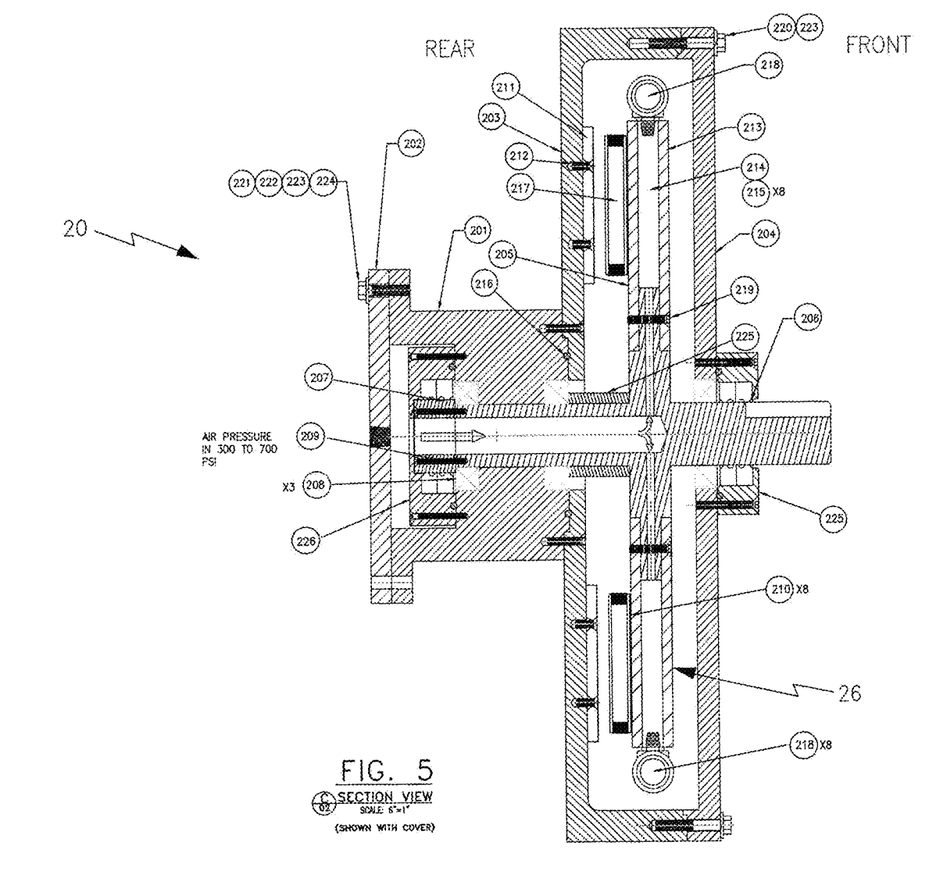
FIG. 5 is a cross section view of the Air Turbine 20 according to the preferred embodiment of the present invention.
Figure 6A:
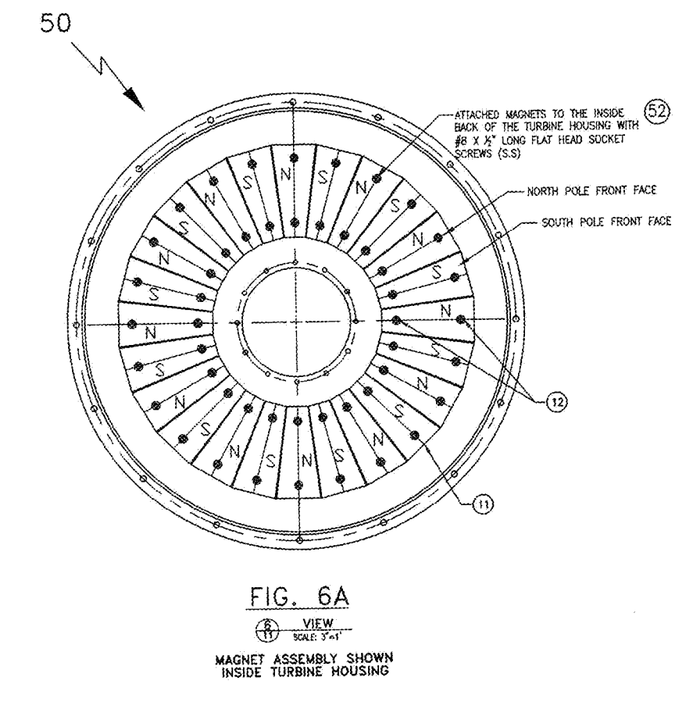
FIG. 6a is a front plan view of a magnetic core 50 showing the Neodymium Magnet 52 arrangement located inside the housing.
Figures 6B, 6C:
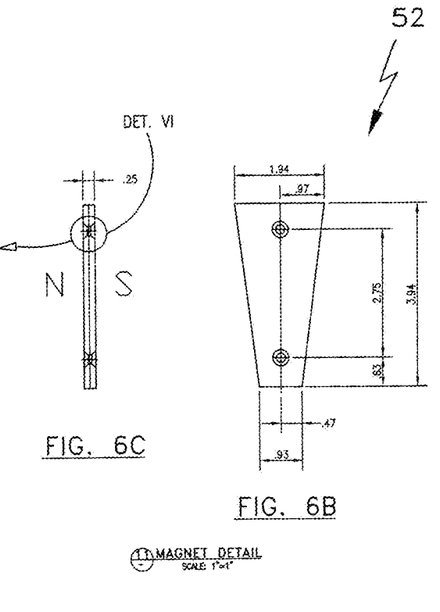
FIG. 6b is a front plan view of an individual magnet 52 shown in detail.
FIG. 6c is a side elevational view of the magnet 52 of FIG. 6b.
Figure 6D:
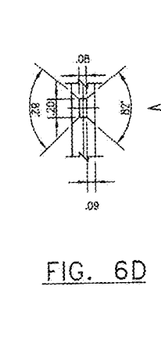
FIG. 6d is detailed sectional view taken along DETAIL VI of FIG. 6c.
Figure 7A:
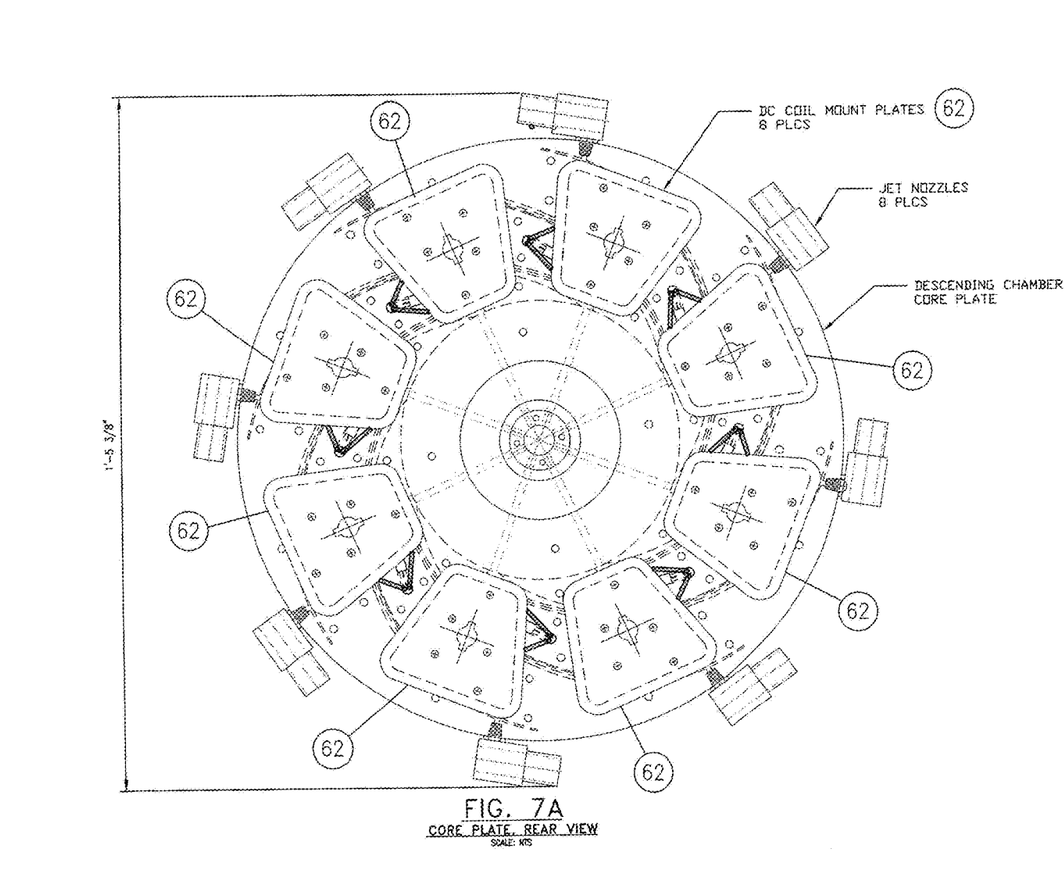
FIG. 7a is a front plan view showing the DC generator coils 60 mounted on the descending chambers 22.
Figure 7B:
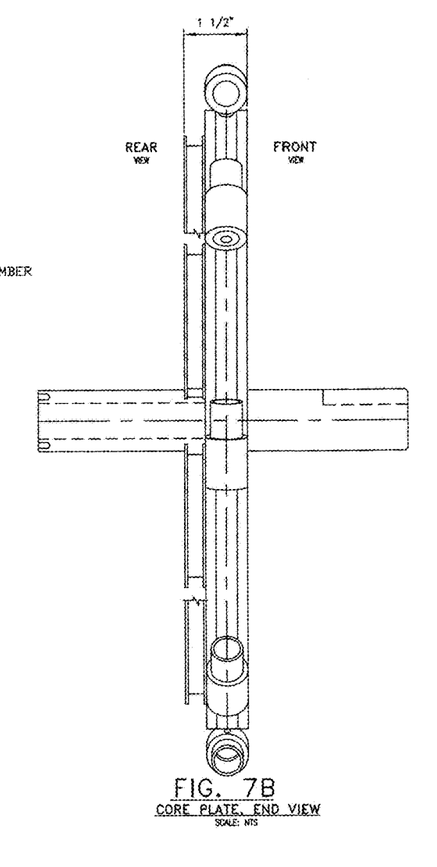
FIG. 7b is an end elevational view thereof.

As shown best in conjunction with FIG. 4a through FIG. 5, the air turbine 20 defines the power turbine housing 203 containing a rotating air turbine plate formed of a central core 214 rotating about a central shaft 206. The central core 214 forms a plurality of arcuate shaped chambers 22 in fluid communication between the central shaft 206 and terminating each at their radial discharge with a plurality of nozzles 218. Each arcuately shaped chamber 22 retains a thermal heater 215 at its innermost portion. As will be described in greater detail below, the thermal heater 215 may heat air flowing from the central shaft 206 through each of the chambers 22 such as to cause the heated air to expand. The expanded air, being compressed by the rotation of the core plate 214 and a decreasing cross sectional area of each shaft 22 as it spirals outward, becomes highly pressurized at it enters a respective jet nozzle 218.

Heaters 215 may be electrical type heating elements such as to heat the fluid contents of descending chambers 22. This heat flux directed into the working turbine fluid is intended to making steam of any added moisture, with the phase change resulting in an increase in the working fluid pressure. Additional compression caused due to turbine rotation will result in an additional increase in temperature. The heated working fluid in each turbine descending chamber 22 is in fluid communication with and directed to a discharge nozzle 218. The plurality of arcuate shaped chambers 22 terminating each at their radial discharge with a plurality of nozzles 218 gives the entire rotating core assembly 206 it the impression of a sprinkler. The nozzles 218 may be selected as Nex Flow™ Model 45001, 45002 or 45003 as provided from Nex Flow Air Products Corp. of Ontario, Canada, or any functional equivalent. Such a turbine design is very efficient, increases shaft power and extend torque radius resulting from the increased reaction force of the nozzles.

Figure 3:
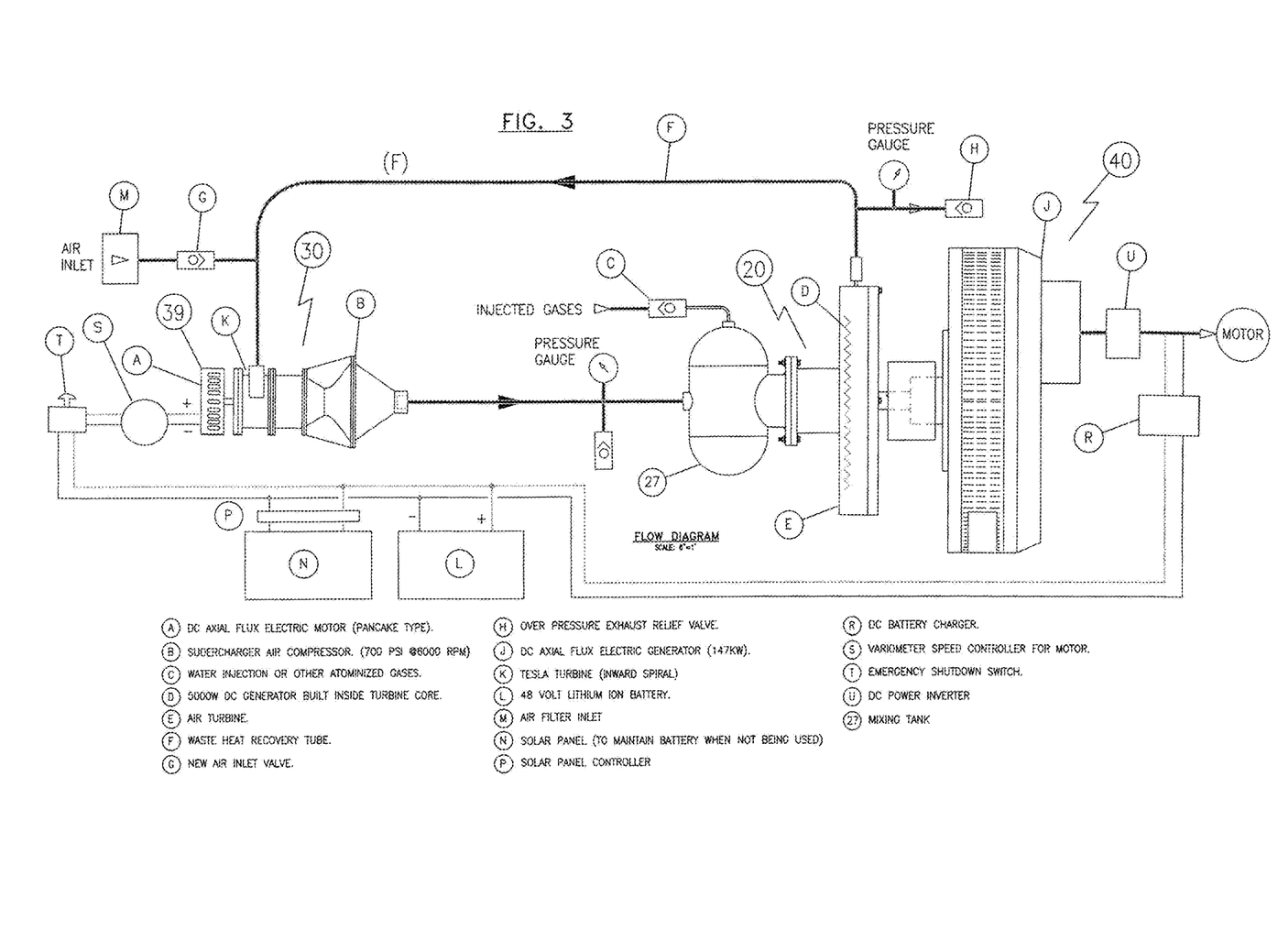
FIG. 3 is a process flow diagram of the operation of the power unit assembly of FIG. 1-2.

As best shown in conjunction with FIG. 3, a built-in (i.e. pancake style), outside-in axial flux generator (20-D) is providing power to heaters 215 (see FIG. 4A) that are in direct physical contact and thermal communication with the walls 214 of the rotating core assembly 206 (FIG. 4A). The axial flux generator 20-D may be provided as a 5000 wDC device. Power transferred through the shaft 206 is coupled to and drives a generator 40. As shown in the presented configuration, the generator 40 may be a 100 KW axial flux DC generator, and as such would result in an electrical output power from about between 10 to 25 times the input power, depending on the load. For purposes of the present disclosure, "input power" is generally defined as the power it takes to turn the small built-in generator plus the power in the compressed air. It should be noted that such an arrangement and configuration should be considered to be merely a design choice selected from within the overall scope and disclosure of the present teachings.

After passing through the rotating core assembly 206 (i.e. through the plurality of descending chambers 204 and out through the discharge nozzles 218), the fluid stream (such as, for example, air) may retain as much as half of its kinetic energy. As shown in conjunction with FIG. 9, the remaining energetic air (F) may then be cycled to the supercharger compressor 30, thereby completing the cycle. This discharge from the nozzle jets 218 is directed into the supercharger 30 as a gas fluid inlet. This recycled inlet gas is then compressed through an axial compressor 304 and expanded through a radial compressor housing 313. The axial compressor 304 is powered through a secondary input shaft 308 in mechanical connection with a variable speed axial flux motor (A). With a variable speed drive regulating the axial flux electric motor, power fluctuations are thereby dampened. In operation, the DC bus voltage which is the main generator 40 can remain approximately constant, regardless of the load. Input 32 to the compressor 30 can be regulated with the rpm of the compressor motor (A) and the current to the heaters 215 in the rotating core assembly 26.

The design of the current invention results in an air turbine 20 with three times as large a torque radius as considered "conventional".

The present Recirculating Air Turbine (or "RAT") is based on the natural expansion principles of the physical gas laws. As shown best in conjunction with FIG. 3, a large part of the turbine's power is derived from internal thermal energy created by high heat and continuing expansion during chamber compression near the periphery. The low speed (e.g. 1200 rpm) naturally super-heated air turbine is capable of capturing and re-expanding its hot exhaust gases for reuse over and over again. By using a built-in generator inside the turbine, electrical energy is created through the increased rpm that then supplies power to the heating elements within the descending piston chambers which can increase the chamber heat up to and past 600° F.

A RAT turbine of the present invention is compact, with an overall form factor capable of being only 4'-4" long (1.321 m), 2'-9" wide (0.838 m) and 3'-0" tall (0.914 m) and having a weight of 590 lbs (267.6 kilogram) and still having a 300 kilowatt output capacity.

Figure 8:
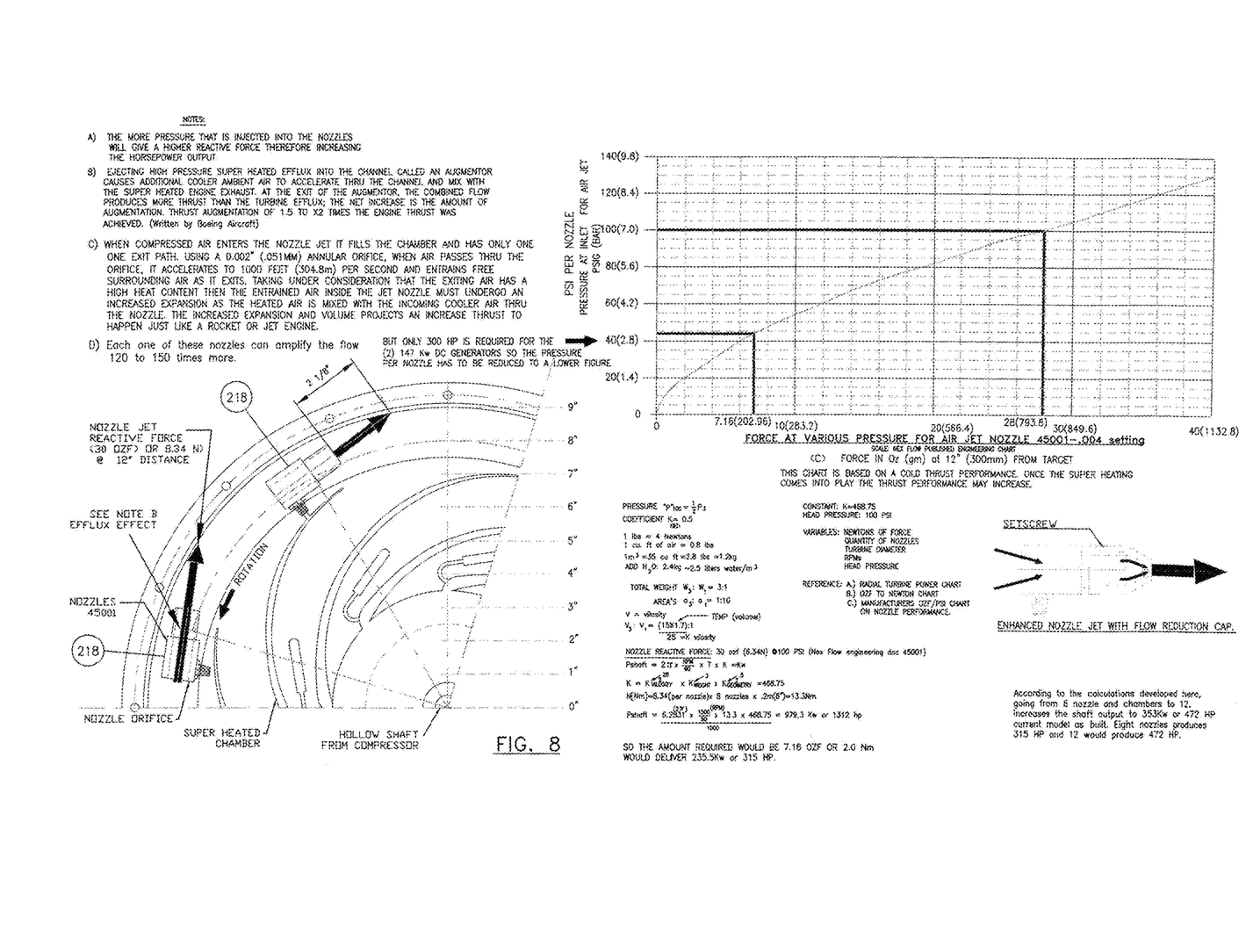
FIG. 8 illustrates the jet nozzles 218 creating a high reactive force at the peripheral of the turbine during a typical operation of the present invention.

As shown in conjunction with FIG. 8, specially designed high pressure depressive jets 218 are built into the peripheral for absorbing and compressing the gas fluid without using any moving devices. This allows production of a large output force from a much smaller amount of input energy. Exhausted gas fluid builds up pressure in the exhaust housing that will become four times greater than the input pressure.

Figure 9:
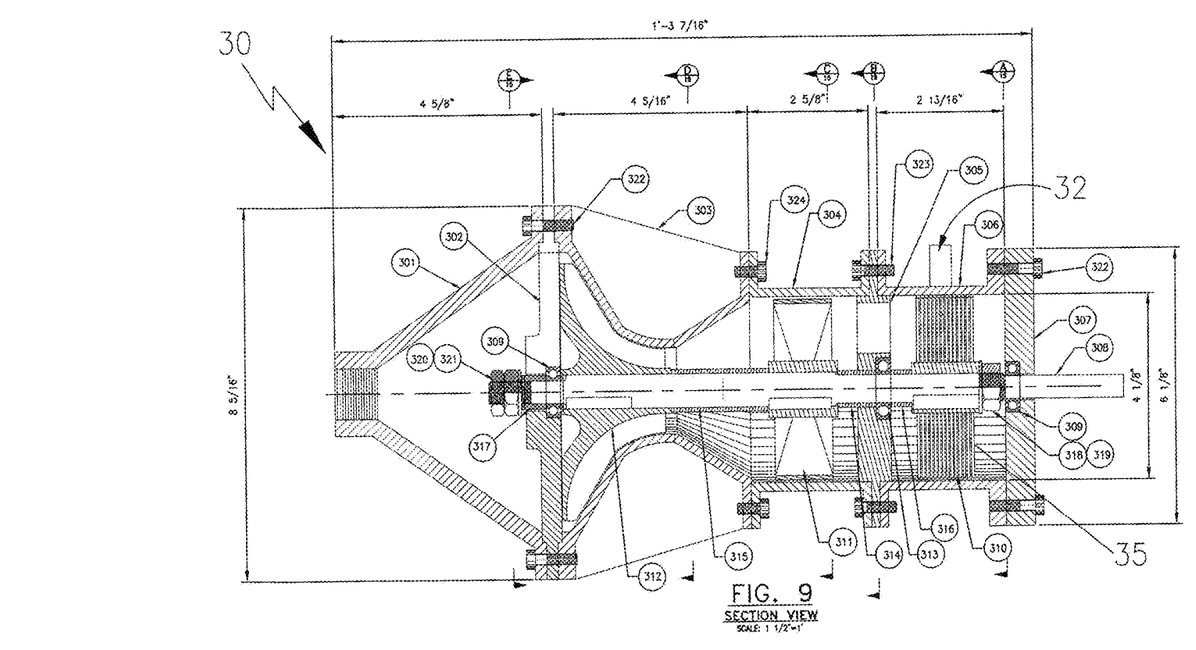
FIG. 9 is a cross section view of the Supercharger 30 showing assembly thereof.

As shown in conjunction with FIG. 9, the Supercharger Compressor 30 is comprised of an axial 311 and radial 312 compressor veins that are rotated and controlled by a variable speed Axial Flux DC electric motor (A). The motor (A) controls the intake and the exhaust pressures. Located in the rear of the Supercharger 30, a Tesla turbine 310 is incorporated into the assembly. This Tesla turbine 35 receives condensed jetted pressure from the turbines exhaust and spins up the supercharger, thereby relieving the supercharger 30 of its electrical input from the electric axial flux variable speed motor 39. The electric motor 39 is only used to spin up the supercharger 30 initially to create the head pressure necessary to bring the air turbine 20 up to speed. The rear 307 of the supercharger 30 ventilates with holes that are left open in order to "take in" or "let out" the recycled air within the system. The in-winding air flow current exits the center of the Tesla turbine 35 and flows into the Supercharger 30 for re-compression. The Supercharger 30 has only one moving part, and can compress up to 1100 liters of air per minute at 49 (700 psi) atmospheres. Only one supercharger 30 may be required to produce the air supply. Less than 40 psi per nozzle is required to produce the 300 hp output.

Figure 10:
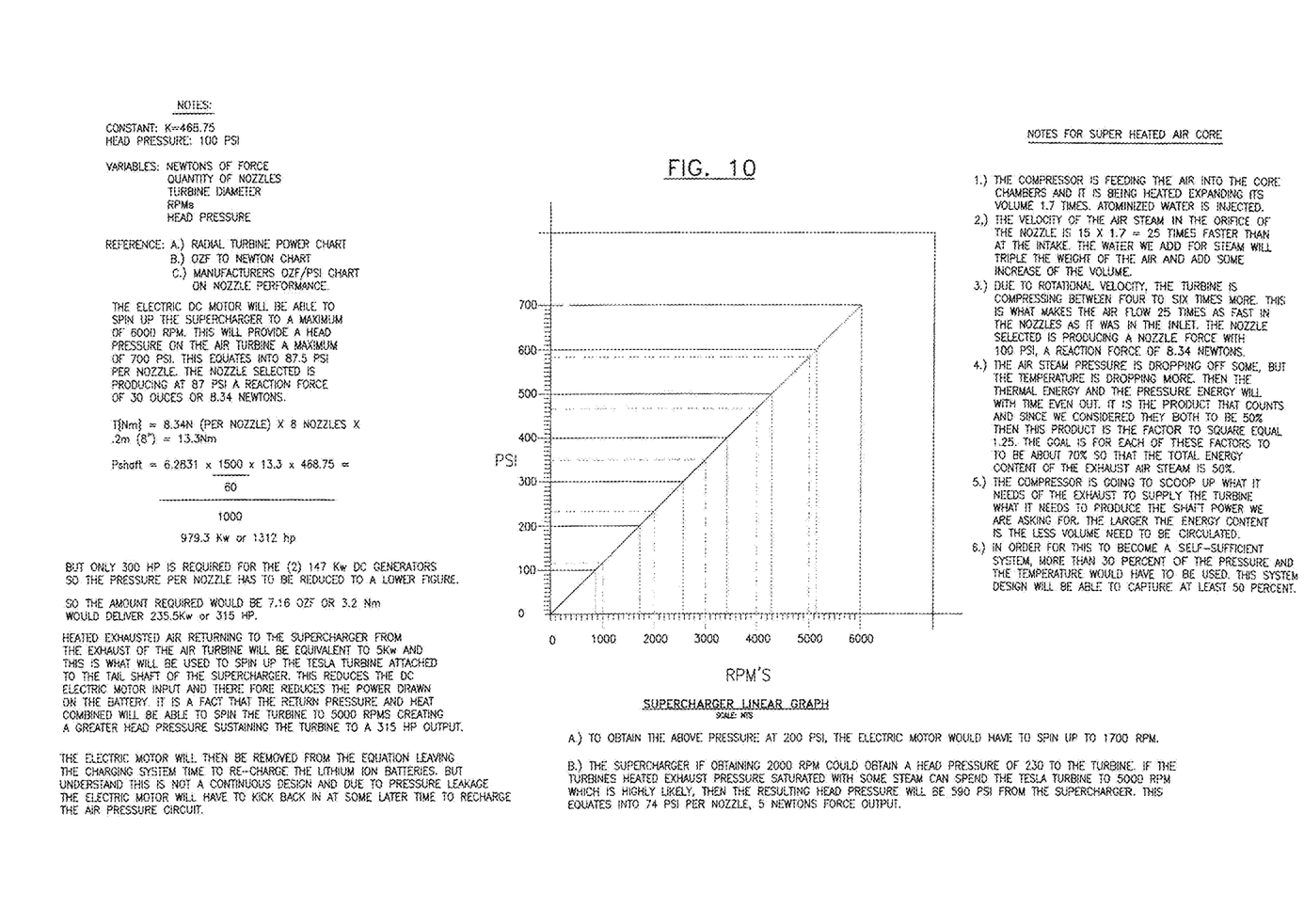
FIG. 10 depicts a linear curve of the power output of the Supercharger 30.
Figure 11:
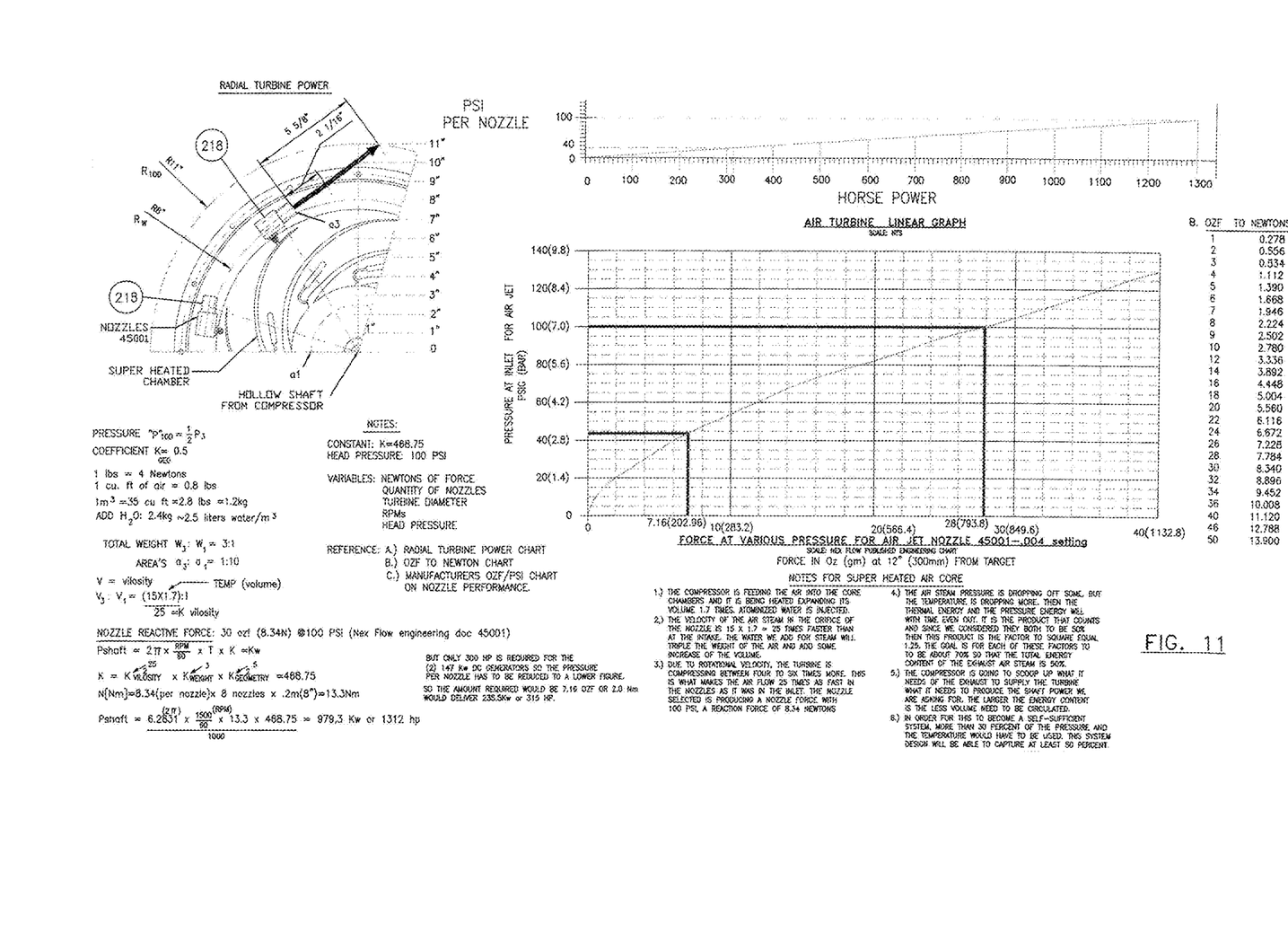
FIG. 11 depicts the pressure at inlet verses force air jet nozzle graph, including a linear power (i.e. hp vs psi) curve of the Air Turbine 20.

As shown best in conjunction with FIG. 10 and FIG. 11, the faster the turbine goes the more heat is applied into the expansion part of the air stream by the thermal heating elements. When full heat is obtained in the descending chamber pistons (600° F.), atomized water can be injected into the mixing tank 27 to drive the turbine 20 to a higher torque output. Super heating the dry air to several hundred degrees causes an increase in volume under constant pressure over 50 percent. By adding additional moisture to the saturation point pressures are greatly increased thru release of latent heat of evaporation. A large part of the turbine's power is derived from exchange of internal thermal energy. The water can be obtained from rain or other natural sources. Water only enhances the torque output shaft driving force and is not required (except to replace friction losses). All ambient air contains a certain amount of humidity and this helps power the air turbine. Eliminating the need for a gearbox, the supercharger in the present embodiment is a direct drive powered by a high torque variable speed AC electric motors. The flow can therefore be regulated so that the compressed air output will match the air demand.

The theoretical efficiency of the turbine is calculated in the high 90 percentages with a continuous output of 235.5 Kw (315 hp) shaft power with only a 40 psi per nozzle input at 1200 rpm. Once the air exits the periphery of the power turbine thru the nozzle jets it circulates around the inside of the housing, exiting thru the exhaust ports. Inside the exhaust housing the cooler air will circulate toward the center and the higher temperature air will circulate at the outer circumference. Exhaust tubes from the housing lead to the intake of the Supercharger. The back pressure in this housing will probably reach 30 atmospheres, and does not interfere with the reactive thrust of the turbine jets. No resulting back pressure can bind up the speed of the power turbine as in conventional piston type air engine designs with conventional valves.

In the back of the power turbine 20, the compressed air enters through the plate 202 which comes from the supercharger 30 and enters into the hollow shaft 206. After passing down thru the shaft and thru the hub it then flows into the core plate 214. And onto the peripheral nozzle jets 218.

Refer again in greater detail to FIG. 8, when compressed air enters the nozzle jet, it fills a chamber with only one exit path. Using a 0.002" (0.051 mm) annular orifice, when air passes thru the orifice it accelerates to 1000 feet (304.8 m) per second and entrains free surrounding air as it exits. Taking under consideration that the exiting air contains a high heat content then the entrained air inside the jet nozzle 218 must undergo an increased expansion as the heated air is mixed with the incoming cooler air thru the nozzle 218. This increased expansion and volume projects an increase thrust to happen just like a rocket or jet engine. Ejecting high pressure engine efflux into a channel (called an augmentor) causes additional cooler ambient air to accelerate through the channel and mix with the engine exhaust. At the exit of the augmentor, the combined flow produces more thrust than the input engine efflux; the net increase is the amount of augmentation. In laboratory tests, thrust augmentation of 1.5 to 2 times thrust was achieved.

As shown throughout the Figures, an improved Super High Torque Axial Flux Electric Motor 39 is shown used to operate the present Supercharger Compressor 30. As would be known by a person having ordinary skill in the relevant art, Axial Flux Motors 39 are producing more torque (or shaft power) for the input than any other types of motors. By utilizing this principal, a Super High Axial Flux Torque Motor is adapted that obtains more than twice as much shaft power as we have input power.

Each of these Super High Axial Flux Torque Electric Motors has maximized shaft power by maximizing the torque radius. This is combined with the greatest possible energy efficiency, substantial component reduction, and significantly smaller footprints than what is common in today's drive trains. These electric motors can produce up to 2 kW per kg of weight. So a 150 horsepower motor (112 kW) will weigh 11.3 kg instead of 227 kg currently purchased off the shelf today. A standard Axial flux motor (AFM) with a modern inverter can already be made 95% efficient. Its weight is only one fifth of what a standard induction motor weighs, and it provides much more torque. They are as powerful as an induction motor. Building the same motor on a radius that is three times larger than the radius of the standard motor makes the AFM produce three times the torque or three times as large a shaft power for the same current input. If we feed the motor with this extra torque radius with one third of the power that a normal motor is drawing then it will produce the same shaft power as the regular motor. So the motor with extra large torque radius provides the same shaft power as an equivalent induction motor for only 25% of the electricity that a standard induction motor will require.

Refer to FIG. 10 and FIG. 11, Linear Power Graphs are shown for the Turbine and Supercharger. The present modified supercharger is driven by a variable speed DC electric motor. It is capable of compressing up to 700 psi pressure at 6000 rpm. With the variable speed option, the pressure can be adjusted up or down whereby changing the head pressure to the air turbine and hence forth readjusting the shaft horsepower output to the generator. The linear graph shows the power input required of the dc motor to create the head pressure. In such a configuration, not as much DC input energy will be required of the supercharger once it reaches its full potential because the heated, expanded volume of gas's exiting the air turbine which becomes a greater amount is re captured and re compressed as a head pressure. The gas movement has very little time to lose the acquired heat and so recovery of at least 50 percent of our heated energy is possible. The dc electric motor gets its energy from the battery storage. Once the system reaches its full output rpm the generator begins recharging the battery storage. Another method for starting the system is using a small tank of compressed nitrogen and releasing this gas into the mixing tank 27 to create a suitable head pressure to begin the spin up process of the air turbine.

Referring to the linear graph of the air turbine, FIG. 11 gives some idea of the psi head pressure that could be obtained verses the shaft horsepower output.

Referring in conjunction with FIG. 6A through FIG. 7B, the high gauss, high temperature neodymium magnets 52 are shown mounted inside the back wall of the air turbine. These magnets 52 are mounted in a circular fashion in order to provide the needed energy to power up the electric coils 62. The electric coils 62 as seen in FIG. 7A are mounted to the front side of the turbine chamber plates and wired directly into the thermal heaters 215 mounted inside the descending chambers 22. When the shaft 206 of the air turbine begins to rotate the electric DC current begins to supply current to the thermal heaters 215 and to heat up the descending chambers 22. As the speed of the turbine increases, so does it also increase the power to the thermal heaters and increases the heat output. Having the electric heat directly in the air turbine air flow is highly efficient in hot-cold thermal transfer. The turbine is designed to spin at 1200 rpm and is regulated. If the turbine runs at a higher speed the chambers will continue to increase in heat output and also the horsepower will increase. There may be no switches nor capacitors designed in to the circuit so reliability can be higher. The generator output is designed for a 5000 watt continued output and can be sized up to produce more power output.

The use of the neodymium magnets are rated to produce the maximum gauss output up to 350 degrees before losing their magnetic strength. Since the higher heat is being drained out of the refrigerator of the exhaust housing the magnets should stay well within their strength design field. The cooler air will circulate closer to the center of the exhaust housing and the higher heat will be closer to the peripheral. The magnets are located in the cooler zone area of the turbine housing. The power dc coils will also be cooled as their heat will be extracted and recovered and sent to the supercharger.

As further shown in conjunction with FIG. 4A through FIG. 4E, descending chambers 22, heating elements 215 and jet nozzles 218 are illustrated showing the pattern of the descending chambers and the heating elements 215 mounted within. There are several advantages of such a design. First, the laminar air flow into the chambers 22 follows the leading edge of the chamber plate and therefore creates a pushing effect much like a spinning pinwheel. As the airflow is compressed into these chambers they must pass thru the electric heat. The chambers walls may be designed of copper and brass, such that the material, once heated, will store and radiate a higher heat into the air stream. As the gas fluid undergoes thermal heat exchange during this time it will continue to move toward the peripheral from centrifugal force. As the speed of the turbine increases the molecules will expand from the induced heat, but as they are now being more compacted because of the reduction of the chamber walls, will continue to produce a natural form a heat from compression. If the air gas has been saturated with moisture in the mixing tank before coming into the chamber, then the water molecules will help to compact the air molecules to an even tighter capacity. The thermal expansion from the water will become 2.5 times greater at this point near the peripheral. When the expanded, heated gas reaches the jet nozzle intake it will have multiplied its force several times. Ejected from the jet nozzle 218 this force now becomes a very powerful reactive force. When this ejected force is now joined with the mass of the radius, the outgoing shaft force multiplies again and gives off considerable horsepower.

The reactive force of the jet nozzles 218 can be up to 25 times greater than a standard cone shaped force nozzle. As an example, the cone shaped standard nozzle with a nominal reduction would produce 2 Newton of force per nozzle with 100 psi of compressed air force. Using the new jet nozzles with the same psi output will produce 8 Newton force.

This psi is justified on a cold jet application and when the higher heat and compression is taken into consideration the nozzle force is multiplied again to 12 Newton. Now if we add in the ejection thermal equations of mixing the ejected air with the cooler air circulating around in the refrigerator, our nozzle force can again double bringing it to 24 Newton. Converting this into horsepower figures goes from 300 to 1300 to 3000. The faster the turbine is allowed to spin the horsepower output gets even greater.

Referring to FIG. 5, a cross section view of the air turbine is show without the mixing buffer tank. In an optional configuration a mixing tank 27 may be provided in which compressed air fluid enters and may be mixed with atomized water, nitrogen, or deuterium and helium-three. All these chemical injections will produce an expansive reaction with the high heat chambers and does not create any form of combustion whatsoever. The hollow shaft 206 rotates the chambers 22 and directs the air flow into the heated descending chambers where a higher laminar flow takes place, whereby said previously, can create a further spinning wheel action to take place. This adds further force to the rotation of the shaft. The cross section also shows the placement of the jet nozzles in relation to the chambers. Only two bearings are required for the shaft and give a high life value of maintainability with easy maintenance.

As shown in FIG. 9, the supercharger assembly is shown adapted for use herein. Being assembled with an axial and radial compressor combined, this compressor will recharge the head pressure system with a clean supply of air faster than the turbine's consumption. It's frictional and torque requirement is extremely low as compared to other reciprocating piston type compressors. While such a supercharger was patented by Lee Rogers for his converted automobile to run a V8 piston engine on a self-compressed air supply (see U.S. Pat. No. 4,693,669), such a design was found to be flawed mechanically and henceforth improvements to this supercharger are provided to make the assembly easier. A front radial bearing support was added over the existing design which made the cone assembly easier to install. Also a Tesla Turbine was added to the rear section in which incoming pressure could be used to spin the shaft of the supercharger whereby reducing the electrical power input from the DC variable speed motor. Power reduction has been estimated to near 75 percent. The in-winding air current exits thru the center of the Tesla Turbine and enters the axial compressor. The rear of the supercharger is capped off in this design also in order to create a closed loop system.

When referring to the linear chart of FIG. 10, it would be noticed that the power input required of the electric motor to power the supercharger to achieve the 100 psi output is less than 50 percent. Given the fact the supercharger is capable of a 700 psi head pressure at 6000 rpm, the actual is considered by the equation (HP)=Pressure (psi)×Volumetric Flow Rate (VFRcfm)/229. Pressure increases both the rpm and the torque. Since the power is proportional to the product of rpm×torque, the power output is roughly proportional to the square of the pressure. Increasing the pressure by 3 fold would then increase the power by 9 times! (15 kW at 4 bar would theoretically become 140 kW at 12 bar—or—25 HP at 60 psi would theoretically become 240 HP at 200 psi). This is justified on a cold thermal pressure gradient and contains no heat.

This present design needs no high compression tanks to sustain its power output as the supercharger is more than capable of supplying the needed compressed air electrically as shown. This makes the assembly much lighter and less complicated from existing designs.

2. Operation of the Preferred Embodiment

Applications for this technology are numerous, including: "Range Extenders" for Electric Cars, (EV2G); Utility and Larger Diesel Truck Conversions; RAT Powered Electric Bikes and Scooters'; Super Electric Boats and Yachts; Hybrid Electric VTOL Aircraft UAV or Personal Aircraft; or Remote Electric Power Stations. Existing solar and wind energy suffers from intermittent supply. If the wind blows too hard, the wind generators have to shut down or if the wind doesn't blow the wind generators produce no electricity or income. Solar panels do not produce power at night or when heavy clouds are present. Our technology relies on compressed air to produce a continuous output 24 hours a day. When the others are sleeping our technology is still producing day in, day out, rain or shine.

There are 300 million cars on the road in the United States and equally as many in Europe and almost all are combustion automobiles with a life expectancy of 10 years. Our air turbine/generator as a 50 kW unit could be used to replace the combustion engines in these cars and small trucks.

Making them a full hybrid electric vehicle. With this technology installed within a transportation vehicle it could very well become EV2G vehicles (Electric Vehicle 2 Grid).

Electric cars being sold by other auto makers will want to install our air turbine into their electric cars so as it will give them unlimited range with no fuel cost. Again this new market will reach into the billions as time goes on. These will become known as "Range Extenders" and will be environmentally friendly. Utility trucks and larger diesel trucks can also be converted. This market is going to be huge in value. Air turbine kits produced for a market of 500,000 units a year can have a selling cost of $25,000 with installation costs driving the price to $40,000 each. But the savings of not having to pay for fuel will pay for itself in one year. Most truck manufacturers are pushing propane conversions for diesel engines but propane costs could probably also rise sharply in the future. When these big trucks are sitting and not being used they can be plugged into the smart grid and make their owners several thousands of dollars a month in extra income. Converting truck engines could create more jobs, taxes, financing possibilities and another multi-billion dollar market potential.

Rotary air turbine powered Bicycles and Scooters using a smaller design 2500 watt generator may be capable of being propelled to 70 kilometers per hour or faster. A hybrid bicycle when not being used for transportation purposes can provide power to operate light bulbs or cooking stoves for poor families. Bicycles are essential transport in many poorer parts of the world, and this could greatly increase its efficiency and load bearing capacity, and replace cars in urban areas. Bicycling has become a worldwide sport today and with this added technology one can go anywhere and be able to camp out among the stars and still have power capabilities to power lap top computers or a small TV and some lights. One can easily enjoy all the comforts of home outdoors.

Electric boats and yachts may further undergo modifications to install turbine generators of the present design. This may provide the means to travel worldwide without the need for combustion fuel. The power system are quiet, clean and efficient, and also provide less chance for fire hazards from the large amount of fuel that must be carried for long trips. This market is in the billions of dollars in revenues and can provide new jobs for technical people and new tax money for many countries.

New generation of personal aircraft can now be designed making these into full electric vehicles with unlimited range. The lightness and power capabilities of the axial flux electric motor technology will bring about more powerful thrusters creating Vertical Takeoff and Landing concepts that are quieter and faster than conventional gas counterparts. This is excellent technology for the growing Unmanned Aerial Vehicle market coming about by the military. Again, this is another potential billion dollar market place for this technology.

Remote Power Generation Stations can be installed in areas where it is to costly to bring in a power grid. By combining several of these turbine generators a very large amount of electrical power can be provided in a small commercial type building. The cost for such an electrical generation system is 70 percent cheaper to install and the maintenance cost also becomes smaller. A 12×18 meter building could produce 10 MW of electrical power.

It is our contention that utilizing the existing electric utility distribution infrastructure would accelerate market penetration for the air turbine systems. The present design provides a much needed solution in electrical power source generation that is economical and cheap to operate. Location makes no difference for there is no combustion fuel base or storage required. Grid rebuilding in places where weather disasters have destroyed power disbursement can now be easily regenerated and restored at much lower costs.

A self-powering air turbine generator will serve as the primary source for electricity without a connection to the existing utility grid, as well as ultimately replace "non-electric" energy consumption devices (e.g., natural gas furnaces and water heaters).

The present technology can provide electrical power generation from 100 kilowatt output up to larger units supplying 5 megawatts. Smaller systems for bicycles and scooters can also be developed producing 2.5 kilowatt. All of these systems produce exhaust but it is clean reusable air that is filtered and cleaned thru the intake air canister. Any of these systems can be installed in underground locations, inside buildings, or outside remote locations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A re-circulating heat pump turbine comprising:
    an air turbine comprising:
        a compressed air intake;
        an exhaust air discharge; and
        a power turbine contained in a power turbine housing and further comprising:
            a rotating air turbine plate formed of a central core rotating about a central shaft;
            a plurality of arcuate shaped chambers formed within said central core, each said chamber in fluid communication between the central shaft and terminating each at a radial discharge with a perpendicularly directed nozzle;
            each arcuately shaped chamber retaining a thermal heater at an inner portion, each said thermal heater in thermal communication with air flowing from the central shaft through each of the chambers and adapted to create a thermal expansion of liquid entrained air flowing therethrough;
    a supercharger comprising:
        an operative intake in fluid communication with the exhaust air discharge;
        a compressed air discharge in fluid communication with the compressed air intake; and
        a drive motor operatively coupled to and driven by said air turbine;
    a DC generator operatively coupled to and driven by said air turbine, wherein during operation air is communicated in a unidirectional circuit between the air turbine and the supercharger; and
    a mix tank for mixing an entrained expansion liquid into an air feed in fluid communication between the compressed air discharge exiting the supercharger and the compressed air intake entering said power turbine; and
a rotating valve assembly for regulating flow of liquid entrained fluids to said power turbine.

2. The re-circulating heat pump turbine of claim 1, wherein said DC generator further comprises an axial flux generator, said generator providing electrical power to the thermal heaters that are in direct physical contact and thermal communication with the rotating valve assembly of said air turbine;
wherein said heaters heat the fluid contents of descending chambers formed by said rotating valve assembly.

3. The re-circulating heat pump turbine of claim 2, wherein said rotating valve assembly comprises:
a circular, rotating turbine plate;
a plurality of descending chamber formed by said turbine plate between an anterior inlet and a radial discharge;
said plurality of descending chambers terminating at their radial discharge with a plurality of nozzles.

4. The re-circulating heat pump turbine of claim 3, wherein each said plurality of descending chambers decreasing in cross sectional area as it spirals outward.

5. The re-circulating heat pump turbine of claim 4, wherein a discharge of said plurality of nozzles is in fluid communication with an inlet of said supercharger.

6. The re-circulating heat pump turbine of claim 5, wherein
said supercharger comprises:
axial compressor veins;
radial compressor veins;
said axial compressor veins and radial compressor veins controlled by a variable speed axial flux DC electric motor;
a Tesla turbine for receiving condensed jetted pressure from the air turbine's exhaust air discharge and providing rotational motion to said supercharger.

7. The re-circulating heat pump turbine of claim 6, further comprising:
magnets mounted inside a back wall of the air turbine, said magnets mounted in a circular fashion in order to provide the needed energy to power up electric coils mounted to the front side of the air turbine chamber plates and wired directly into the thermal heaters mounted inside the descending chambers.

8. The re-circulating heat pump turbine of claim 1, further comprising:
an electrical power source in operative electrical communication with a supercharger drive motor in operative connection with the supercharger, wherein said electrical power source is selected from one or more sources of a group comprising: at battery source; a solar panel; and an output from the DC generator.

9. A method for powering a DC generator, said method comprising:
a. operatively coupling said DC generator to an air turbine;
b. operatively coupling an input of said air turbine to an output of a supercharger or compressor;
c. driving said air turbine by a compressed fluid discharge from the supercharger or compressor; and
d. driving said supercharger or compressor by a combination of
i. a drive motor operatively coupled to said supercharger or compressor; and
ii. compressed air discharged from said air turbine and in fluid communication with an air intake of the supercharger or compressor;

wherein said air turbine further comprises:
a power turbine contained in a power turbine housing;
a mix tank for mixing and entrain liquid into an air feed in fluid communication between the compressed air discharge existing the supercharger and the compressed air intake entering said power turbine;
a valve assembly for regulating flow of liquid entrained fluids to said power turbine, said valve assembly comprising:
a rotating air turbine plate formed of a central core rotating about a central shaft;
a plurality of arcuate shaped chambers formed within said central core, each said chamber in fluid communication between the central shaft and terminating each at a radial discharge with a perpendicularly directed nozzle; and
each arcuately shaped chamber retaining a thermal heater at an inner portion, each said thermal heater in thermal communication with air flowing from the central shaft through each of the chambers.

10. A method for powering a DC generator, said method comprising:
a. operatively coupling said DC generator to an air turbine;
b. operatively coupling an input of said air turbine to an output of a supercharger or compressor;
c. driving said air turbine by a compressed fluid discharge from the supercharger or compressor; and
d. driving said supercharger or compressor by a combination of
i. a drive motor operatively coupled to said supercharger or compressor; and
ii. compressed air discharged from said air turbine and in fluid communication with an air intake of the supercharger or compressor;
wherein said DC generator comprises an axial flux generator, said generator providing electrical power to heaters that are in direct physical contact and thermal communication with a rotating valve assembly of said air turbine;
wherein said heaters heat the fluid contents of descending chambers formed by said rotating valve assembly.

11. The method of claim 10, wherein said rotating valve assembly comprises:
a circular, rotating turbine plate;
a plurality of said descending chamber formed by said turbine plate between an anterior inlet and a radial discharge;
said plurality of descending chambers terminating at their radial discharge with a plurality of nozzles.

12. The method of claim 11, wherein each said plurality of descending chambers decreases in cross sectional area as it spirals outward.

13. The method of claim 12, wherein a discharge of said plurality of nozzles is in fluid communication with an inlet of said supercharger or compressor.

14. The method of claim 13, wherein said supercharger or compressor comprises:
axial compressor veins;
radial compressor veins;
said axial compressor veins and radial compressor veins controlled by a variable speed axial flux DC electric motor;
a Tesla turbine for receiving condensed jetted pressure from the turbines exhaust and providing rotational motion to said supercharger.

15. The method of claim 9, further comprising:
d. heating the input air to said air turbine.

16. The method of claim 15, further comprising:

e. mixing and entraining liquid into the input air to said air turbine such that heating of said entrained air feed causes vapor expansion of said entrained liquid.

17. The method of claim 10, further comprising:

d. heating the input air to said air turbine.

18. The method of claim 17, further comprising:

e. mixing and entraining liquid into the input air to said air turbine such that heating of said entrained air feed causes vapor expansion of said entrained liquid.

* * * * *